United States Patent Office 3,654,323
Patented Apr. 4, 1972

3,654,323
SULFONE-ESTER COMPOUNDS
John R. Clark, Nutley, and Claire Bluestein, Glen Rock, N.J., assignors to Witco Chemical Corporation, New York, N.Y.
No Drawing. Filed Oct. 24, 1969, Ser. No. 869,362
Int. Cl. C07c 143/90
U.S. Cl. 260—400
6 Claims

ABSTRACT OF THE DISCLOSURE

Sulfone-ester compounds of the general formula

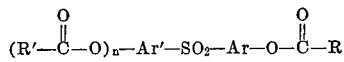

where $n$ is 0 or 1, Ar and Ar' represent aryl radicals, and R and R' represent long chain aliphatic radicals.

This invention relates to novel and useful long chain or higher molecular weight aliphatic mono- and diesters of diaryl sulfones.

Certain sulfone-ester compounds are known in the art and have been disclosed in various patents and publications. For example, hydroxyalkyl esters of sulfonyl dibenzoic acid have been reported as useful in preparing resins, and compounds such as ethyl 4-(dodecylsulfonyl) butanoate are known as plasticizers in vinyl resins and sulfonyl bis aliphatic esters are known as plasticizers for thermoplastic resins. These and similar compounds are disclosed, for example, in U.S. Pat. Nos. 2,614,120; 2,692,207; 2,969,387; 3,028,416 and 3,194,830. Also there have heretofore been reported lower dialkyl esters of dihydroxydiphenyl sulfone such as the diacetate and dibutyrate esters, as mentioned in Chemical Abstracts, vols. 32, 5918; 37, 5040 and 52, 20,0136.

In accordance with the present invention there have been discovered novel diaryl sulfone mono- and diester compounds having the general formula

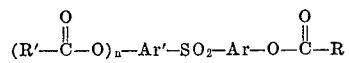

where $n$ is 0 or 1, indicating a mono- or diester, Ar and Ar' represent the same or different aryl radicals and R and R' represent the same or different long chain aliphatic radicals containing from about 7 to 100 carbon atoms. The said esters have useful properties not possessed by the lower aliphatic esters.

In the aforesaid general formula R and R' are the same or different aliphatic radicals, straight or branched chain, as exemplified by alkyls such as n-heptyl, n-octyl, 2-ethylhexyl, n-nonyl, di-isobutylcarbinyl, decyl, undecyl, dodecyl, lauryl, myristyl, cetyl, stearyl and the like or an alkenyl hydrocarbon group exemplified by n-octenyl, diisobutenyl, nonenyl, decenyl, dodecenyl, tetradecenyl, hexadecenyl, octadecenyl and the like containing at least 7 carbon atoms as well as an aliphaticpolyene such as isopreneyl or squaleneyl. R and R' can also be aliphatic radicals containing even greater numbers of carbon atoms, up to about 100, said aliphatic hydrocarbon radicals being derived, for example, from oxidized paraffin waxes, microcrystalline waxes and synthetic Fischer-Tropsch waxes, said oxidized waxes generally containing from 18 to 100 carbon atoms per molecule, and having saponification values of between about 15 and 160, acid values of from about 5 to 60, and molecular weight of between about 280 and 1600, and, more particularly, oxidized microcrystalline and Fischer-Tropsch waxes containing from about 35 to 80 carbon atoms and being predominately paraffnic.

The aforesaid aliphatic hydrocarbon radicals can contain one or more functional group substituents. Exemplary are oxygen-containing radicals such as octoxyethyl, di-butyoxypropyl, dioctoxypropyl, di-octenoxypropyl and other alkoxy-substituted aliphatic groups; halo-substituted radicals such as chlorodecyl, chlorododecyl, bromooctyl and bromooctadecyl, as well as long chain alkenyl radicals containing one or more halogen substituents such as mono- and polychlorodiisobutenyl. R or R' can also represent an aliphatic group containing sulfur such as those having the formula

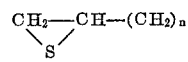

or $CH_3—CH_2—S—(CH_2)_n$ where $n$ is an integer of at least 5, and other similar thioalkyl radicals.

Other functional group substituents which can be present in the aforesaid aliphatic hydrocarbon radicals are exemplified by amino and amido and their N-substituted derivatives; hydroxy and hydroxyalkyl radicals such as hydroxymethyl, hydroxyethyl and higher homologs, hydroxyamino, hydroxyimino and hydroxyphosphinyl; phosphorus substituents such as phospho, phosphono, phosphoranyl, phosphoro, phosphoroso, phosphino and phosphinothioyl; sulfur-containing functional groups such as sulfamino, sulfamyl, sulfanilamido, sulfarilyl, mercapto, sulfino, sulfinyl, sulfo, sulfonyl and the like; nitro, nitramino, nitrosamino, nitrosimino and nitroso; carbonyl, carboxy and carbonyldioxy; acyl radicals such as acetyl, acetoacetyl, butyryl, hexanoyl, lactoyl, lauroyl and dodecanoyl; and aromatic groups such as benzamido, benzenesulfonyl, benzimido, benzoyl, benzylthio, benzoyloxy, benzyloxy, etc.

Embodiments of the present invention of particular value are diaryl sulfone mono- and diesters in which the aforesaid R and R' groups are straight or branched chain alkyl or alkenyl radicals containing from 7 to 22 carbon atoms, especially mono- and di-esters derived from long chain aliphatic monocarboxylic acids such as lauric, palmitic, stearic, oleic and linoleic, saturated tertiary monocarboxylic acids, and other aliphatic monocarboxylic acids containing particularly 9–18 carbon atoms.

The diaryl sulfone ester compounds of the present invention encompass not only diphenyl sulfone long chain aliphatic esters, which are the particularly preferred embodiments, but the $SO_2$ group can be linked to other aromatic radicals. Thus, in the aforesaid general formula, Ar and Ar' can represent aryl radicals such as those derived from aromatic monocyclic hydrocarbons and aromatic polycyclic hydrocarbons exemplified by benzene, bibenzyl, biphenyl, cumene, cymene, ethyl benzene, fluorene, toluene, xylene, naphthalene, phenanthrene and styrene, as well as polyphenyl hydrocarbons such as stilbene and terphenyl. The sulfone can contain some or different aryl radicals. Exemplary asymmetrical diaryl sulfones, which can be reacted to form the novel sulfone-ester compounds of the present invention, are disclosed, for example, in U.S. Pat. Nos. 2,998,453; 2,998,454; 3,125,604; 3,225,104 and 3,402,204.

The aryl radicals of the novel diaryl sulfone ester compounds of the present invention, as a general rule, contain nuclearly substituted groups replacing an aromatic hydrogen. Exemplary are mono- and diesters derived from hydroxyaryl sulfones such as alkyl-substituted hydroxyaryl sulfones as disclosed in U.S. Pat. No. 3,383,-421, methoxylated or hydroxybenzylated dihydroxy diphenyl sulfones as disclosed in U.S. Pat. Nos. 3,225,104 and 3,230,198; monoethers of 2,2' - dihydroxydiphenyl sulfone as described in U.S. Pat. No. 3,408,422; or a compound such as 4-hydroxy - 3 - chlorophenyl sulfone, as disclosed in U.S. Pat. No. 2,314,379; or 5' - chloro- 2′,4-dihydroxydiphenyl sulfone and similar compounds as disclosed in U.S. Pat. No. 2,288,282.

Various methods for the preparation of the novel diaryl sulfone-ester compounds of the present invention can be utilized so long as the essential

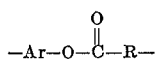

linkage is obtained, i.e. an oxygen atom forming the link between the carbonyl carbon and the aryl radical. Generally, the esters can be prepared by reactions utilizing long chain carboxylic acids but they are also formed through the use of long chain acid anhydrides, acid chlorides, amides, nitriles, unsaturated hydrocarbons, ethers, aldehydes and ketones, and by dehydration of long chain alcohols and by alcoholysis and acidolysis. Exemplary techniques for preparing the long chain aliphatic diaryl sulfone esters include the reaction of a long chain aliphatic acid anhydride or an acid chloride with a diaryl sulfone containing a nuclearly substituted hydroxy group, a catalyst such as magnesium being employed in the acid chloride reaction; reacting a long chain aliphatic amide with a hydroxyphenyl sulfone or with a halogenated sulfone as is disclosed generally in U.S. Pat. No. 2,375,301; and direct saponification of nitriles with alcohols, and similar methods.

Preferably the novel sulfone-ester compounds are prepared by direct esterification between a hydroxy diaryl sulfone, such as dihydroxydiphenyl sulfone, and a long chain aliphatic carboxylic acid, in an approximately 2 to 1 molar ratio (for diester preparation) or a 1 to 1 molar ratio (for monoester preparation) and most suitably in the presence of a condensing agent such as $POCl_3$. A particularly suitable method of preparation has been found to be a transesterification reaction whereby the desired molar equivalent of an aliphatic carboxylic acid, advantageously a $C_{12}$ to $C_{18}$ saturated or unsaturated fatty acid, is reacted with the mono- or diacetate, or other lower alkyl ester, of hydroxydiphenyl sulfone or dihydroxydiphenyl sulfone so as to form the novel esters described herein.

The novel sulfone esters described herein have varied uses, among which are starting materials for polyester sulfone resinous compositions, as synthetic ester lubricants, as intermediates, and for the preparation of ashless grease compositions by combining the esters with petroleum fractions. Liquid diesters of mixed fatty acids are suitable as plasticizers for polyvinyl chloride resins.

The following table lists melting point and elemental analysis data for a number of novel diesters made in accordance with the present invention. Said diesters were prepared either by transesterification of the diacetate or by reaction of long chain fatty acid and sulfone in the presence of phosphorous oxychloride. In the table, R refers to the at least 7 carbon atom containing alkyl group in the general formula

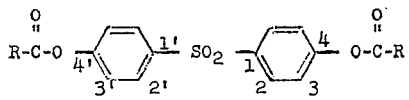

and all of the esters are those of 4,4′-dihydroxydiphenyl sulfone.

The novel sulfone esters, and especially the diesters, of the present invention have been found to have a significant usefulness in the preparation of ashless greases by combining minor proportions, for instance, from about 3 to 10%, of said esters with kerosene, mineral oil, lubricating oil and other petroleum fractions. Stable grease compositions may be formed with no evidence of insolubility or other instability, which is in marked contrast to heretofore known lower alkyl diesters which are incompatible with said petroleum fractions.

The invention is further illustrated by the following examples which are not to be considered as limitative of its scope. All temperatures recited are in degrees centigrade.

EXAMPLE 1

20.0 g. (0.1 mol) of lauric acid was mixed in a 100 ml. flask with 16.7 g. (0.05 mol) of 4,4′-diacetoxydiphenyl sulfone and a small piece of magnesium was added. The mixture was heated at a temperature of 200°–230° for about 30 minutes and the acetic acid formed was removed by vacuum distillation. The mixture was cooled to about 150° and poured, with stirring, into 200 ml. of methanol. The precipitate which formed was identified as the lauric acid diester of 4,4′-dihydroxydiphenyl sulfone. The yield was 91.5% of theoretical.

EXAMPLE 2

A mixture of 75 g. (0.3 mol) of 4,4′-dihydroxydiphenyl sulfone, 171 g. (0.6 mol) of stearic acid and 42 g. of $POCl_3$ was stirred and heated slowly in a 1 liter flask to a temperature of 130°–137° and held at this temperature for about 1 hour. HCl was evolved over the course of the reaction and a condenser was employed to prevent loss of $POCl_3$. The mixture was decanted slowly into about 500 g. of methanol and 213 g. (91%) yield of a waxy solid identified as the stearic acid diester of the sulfone were recovered.

EXAMPLE 3

Excellent ashless grease compositions were prepared by combining, by weight, 95% of kerosene and 5% of the lauric acid diester of 4,4′-dihydroxydiphenyl sulfone or 5% of the palmitic acid diester of dihydroxydiphenyl sulfone. By contrast, when the diacetate of dihydroxydiphenyl sulfone was combined with kerosene in various proportions, a stable grease could not be formed since the diacetate was insoluble in the kerosene and no homogeneous blend could be obtained.

EXAMPLE 4

This example illustrates the preparation of a monoester. 50 g. (0.2 mol) of 4,4′-dihydroxydiphenyl sulfone was stirred with 43.7 g. (0.2 mol) of lauroyl chloride at 160°–170° for approximately 2 hours. The mixture was then stirred into 300 ml. of methanol whereupon some crude lauric acid diester formed which was removed by filtration. The filtrate was evaporated and the residual oil boiled with 150 ml. of ethylene dichloride, cooled and filtered to recover 17 g. of unreacted 4,4′-dihydroxy diphenyl sulfone. The ethylene dichloride filtrate was evaporated and the oily residue stirred with ligroin to precipitate the crude waxy crystals of lauric acid monoester of 4,4′-dihydroxy diphenyl sulfone. After

TABLE I

| R | M.P., °C. | Elemental analysis | | | | | |
|---|---|---|---|---|---|---|---|
| | | Theoretical | | | Determined | | |
| | | Percent C | Percent H | Percent S | Percent C | Percent H | Percent S |
| $CH_3(CH_2)_6$ | 51–53 | 67.0 | 7.5 | 6.3 | 66.97 | 7.73 | 6.49 |
| $CH_3(CH_2)_8$ | 65–67 | 68.8 | 8.25 | 5.73 | 67.98 | 8.25 | 5.84 |
| $CH_3(CH_2)_{10}$ | 75.5–77.5 | 70.36 | 8.80 | 5.21 | 70.22 | 8.97 | 5.53 |
| $CH_3(CH_2)_{12}$ | 84–85 | 71.50 | 9.30 | 4.77 | 71.76 | 9.35 | 5.11 |
| $CH_3(CH_2)_{14}$ | 87–88 | 72.5 | 9.73 | 4.40 | 72.37 | 10.00 | 4.62 |
| $CH_3(CH_2)_{16}$ | 91–92 | 73.64 | 10.0 | 4.08 | 73.29 | 10.2 | 4.26 |
| $CH_3(CH_2)_{20}$ | 89–94 | 75.2 | 10.5 | 3.58 | 75.48 | 10.44 | 3.92 | recrystallization from methanol, 21 g. (24% yield based on 4,4′-dihydroxy diphenyl sulfone) of the pure monoester were recovered, melting at 70–71°. The elemental analysis of the monoester ($C_{24}H_{32}O_5S$) was as follows:

Theoretical (percent): C, 66.70; H, 7.40; S, 7.40. Determined (percent): C, 66.81; H, 7.47; S, 7.67.

EXAMPLE 5

A mixture of long chain diesters was prepared from 108.3 g. (0.6 mol) of a mixture of $C_9$, $C_{10}$ and $C_{11}$ saturated tertiary monocarboxylic acids (sold under the designation "Versatic" Acid) and 100.2 g. of mixed isomers (4,4′ and 2,4′) of diacetoxy diphenyl sulfone according to the transesterification procedure described in Example 1. The crude yield of diester, an oil, was 164 g. (95% of theory). This crude liquid was dissolved in ether, extracted with aqueous sodium bicarbonate and the ether was volatilized to give a clear amber oil having a saponification number of 386 mg. of KOH/g. and an acid number of 7.8 mg. of KOH/g.

EXAMPLE 6

A solution of 10 parts by weight of polyvinyl chloride in 100 parts by weight of tetrahydrofuran was prepared and to this was added 3.5 parts by weight of the liquid diester prepared in Example 5 and a clear, stable solution was formed which, upon drying, gave a clear, smooth film. The film showed good flexibility and compatibility characteristics, said diester functioning effectively as a plasticizer for said PVC resin. A comparative test of the volatility of this diester plasticizer was performed by heating the film for 15 minutes at 150° as well as with a film prepared with dioctyl phthalate plasticized polyvinyl chloride. A weight loss of 0.8% was obtained with the film containing the diester of Example 5 compared with a weight loss of 1.1% for the PVC film plasticized with dioctyl phthalate.

What is claimed is:

1. A diaryl sulfone-ester having the general formula

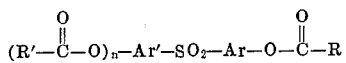

wherein $n$ is 0 or 1, Ar and Ar′ represent aryl radicals, and R and R′ represent long chain aliphatic radicals containing from about 7 to 100 carbon atoms.

2. An ester according to claim 1 wherein Ar and Ar′ represent phenyl.

3. An ester according to claim 1 wherein R and R′ represent alkyl or alkenyl radicals containing from 7 to 22 carbon atoms.

4. An ester according to claim 1 wherein $n$ is 1, Ar and Ar′ are phenyl, and R and R′ are the alkyl portions of an aliphatic monocarboxylic acid containing from about 9 to 18 carbon atoms.

5. An ester according to claim 4 wherein the monocarboxylic acid is a fatty acid selected from the group consisting of lauric, palmitic, stearic, oleic and linoleic acids.

6. An ester according to claim 1 wherein $n$ is 1, Ar and Ar′ are phenyl, and R and R′ are the alkyl portions of a mixture of $C_9$, $C_{10}$ and $C_{11}$ saturated tertiary monocarboxylic acids.

References Cited

UNITED STATES PATENTS 2,282,557   5/1942   Bruson _____ 260—400

ELBERT L. ROBERTS, Primary Examiner

U.S. Cl. X.R.

252—48.2; 260—30.8